(12) United States Patent
Gordon

(10) Patent No.: US 10,756,518 B1
(45) Date of Patent: Aug. 25, 2020

(54) CABLE SECURING DEVICE

(71) Applicant: Chester Gordon, Gardena, CA (US)

(72) Inventor: Chester Gordon, Gardena, CA (US)

( * ) Notice: Subject to any disclaimer, the term of this patent is extended or adjusted under 35 U.S.C. 154(b) by 0 days.

(21) Appl. No.: 16/674,094

(22) Filed: Nov. 5, 2019

Related U.S. Application Data

(60) Provisional application No. 62/837,963, filed on Apr. 24, 2019.

(51) Int. Cl.
*H02G 1/08* (2006.01)
*F16G 11/08* (2006.01)

(52) U.S. Cl.
CPC ............. *H02G 1/081* (2013.01); *F16G 11/08* (2013.01); *H02G 1/083* (2013.01); *H02G 1/085* (2013.01)

(58) Field of Classification Search
CPC ......... H02G 1/081; H02G 1/085; F16G 11/08
USPC ........................................ 254/134.3 R, 134.7
See application file for complete search history.

(56) References Cited

U.S. PATENT DOCUMENTS

| | | | | |
|---|---|---|---|---|
| 2,142,290 A | * | 1/1939 | Slocum .................. | H02G 1/083 403/6 |
| 2,750,152 A | * | 6/1956 | Schinske ................ | H02G 1/083 254/134.3 FT |
| 3,102,715 A | * | 9/1963 | Weitzel .................. | H02G 1/083 254/134.3 FT |
| 4,101,114 A | | 7/1978 | Martin et al. | |
| 4,411,409 A | | 10/1983 | Smith | |
| 5,052,660 A | * | 10/1991 | Bergman ................ | H02G 1/083 254/134.3 FT |
| 5,915,770 A | * | 6/1999 | Bergstrom ............... | H02G 1/00 254/134.3 R |
| 5,938,180 A | * | 8/1999 | Walsten ................. | H02G 1/083 254/134.3 FT |
| 6,193,216 B1 | | 2/2001 | Holen et al. | |
| 6,318,704 B1 | | 11/2001 | Christenson | |
| 7,930,040 B1 | | 4/2011 | Kelsch et al. | |
| 8,302,935 B2 | * | 11/2012 | Maljevic ................ | H02G 1/081 254/134.3 R |
| 9,062,834 B2 | * | 6/2015 | Rennecker ................ | F21L 4/04 |

FOREIGN PATENT DOCUMENTS

WO     2004026393 A3     5/2004

OTHER PUBLICATIONS

Oregon Thread-it Wire Pulling Tool.

* cited by examiner

*Primary Examiner* — Joseph J Hail
*Assistant Examiner* — J Stephen Taylor
(74) *Attorney, Agent, or Firm* — Argus Intellectual Enterprise; Jordan Sworen; Daniel Enea

(57) ABSTRACT

A cable securing device for installing and removing cable or wire through a wall. The cable securing device includes a rod having a first rod section, a second rod section, and a fastener disposed on each end capable of securing a cable thereto. The first rod section is movably secured to the second rod section in order to allow a user to independently rotate each end when installing cable to one of the fasteners. In operation of one embodiment, the user secures a new cable to a first threaded fastener and an old cable to a second threaded fastener. The rod sections are attached to each other if they had not been previously attached, and the new cable is threaded into the wall and old cable is removed from the wall through a single action by the user.

4 Claims, 4 Drawing Sheets

CABLE SECURING DEVICE

CROSS REFERENCE TO RELATED APPLICATION

This application claims the benefit of U.S. Provisional Application No. 62/837,963 filed on Apr. 24, 2019; the above identified patent application is herein incorporated by reference in its entirety.

BACKGROUND OF THE INVENTION

The present invention relates to a cable securing device. The present invention further provides a rod having a fastener disposed on each end thereof for attaching new cable to a first fastener and old cable to a second fastener. In operation, the new cable is threaded into a wall and the old cable is removed from the wall via a single action by the user.

Many professionals, such as electricians and cable technicians, must install and remove cable and wires through walls on a regular basis. The professional must first remove the old cable in order to create an empty space in the wall to receive the new cable. Cable and wires are flexible and do not maintain a rigid structure when being passed through a wall or attempting to find an exit point for removal from the wall, which is frustrating for the professional.

Furthermore, cable installation often requires the professional to find the old cable and remove it from one side of a building, such as the exterior. Currently, professionals may tie the end of the cables into loops with the hope of grabbing the loop of the cable with a pole or other fishing like device. However, the cable may now not fit through small passages within the wall or may be otherwise caught onto other objects within the wall space, such as beams, other cables, fasteners, and the like.

After removing the existing cable, the professional then must walk to the other side of the wall, sometime moving from the interior to the exterior of a building, in order to install the new cable. The continuous need to exit a building, travel to the cable removal location, and reenter the building to complete cable installation is cumbersome and time consuming. For a professional that performs cable or wire installation multiple of times per day, this time can be better spent servicing more clients or servicing other needs of the client.

As a solution, some professionals use a rigid tool to secure to new cable to pull the cable into the wall. However, this type of tool does not allow for a professional to simultaneously remove the old cable with a single action.

In light of the devices disclosed in the known art, it is submitted that the present invention substantially diverges in design elements and methods from the known art and consequently it is clear that there is a need in the art for an improvement for cable securing device. In this regard the instant invention substantially fulfills these needs.

SUMMARY OF THE INVENTION

In view of the foregoing disadvantages inherent in the known types of cable securing devices now present in the known art, the present invention provides a new cable securing device wherein the same can be utilized for installing new cable and removing old cable via a single action by a user.

It is an objective of the present invention to provide a cable securing device having a rod having a first rod section, a second rod section, and a fastener disposed on each end of the rod configured to secure a cable thereto. In one embodiment, the first rod section is rotatably secured to the second rod section in order to allow a user to independently rotate each end when installing cable to one of the threaded fasteners.

It is another objective of the present invention to provide a cable securing device wherein the first rod section and the second rod section are removably secured to one another, allowing a user to separate the rod when securing the cable to each end thereof.

It is another objective of the present invention to provide a cable securing device wherein the first and the second rod section of the rod are rotatably secured to one another, allowing the rod to be non-linear.

It is yet another objective of the present invention to provide a method of simultaneously installing and removing a cable, comprising: providing a rod having a first rod section affixed to a second rod section at a middle section, wherein the first rod section comprises a first fastener disposed at a first distal end thereof and the second rod section comprises a second fastener disposed at a second distal end thereof; securing a first cable to the first fastener and a second cable to the second fastener, wherein the second cable is positioned within a wall; and feeding the first cable through the wall such that the second cable exits the wall.

It is therefore an object of the present invention to provide a new and improved cable securing device that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

DETAILED DESCRIPTION OF THE INVENTION

Reference is made herein to the attached drawings. For the purposes of presenting a brief and clear description of the present invention, the preferred embodiment will be discussed as used for securing each fastener to a first and second cable and cooperatively guiding the present invention and affixed cables through a wall. The figures are intended for representative purposes only and should not be considered to be limiting in any respect.

Figure 1A:
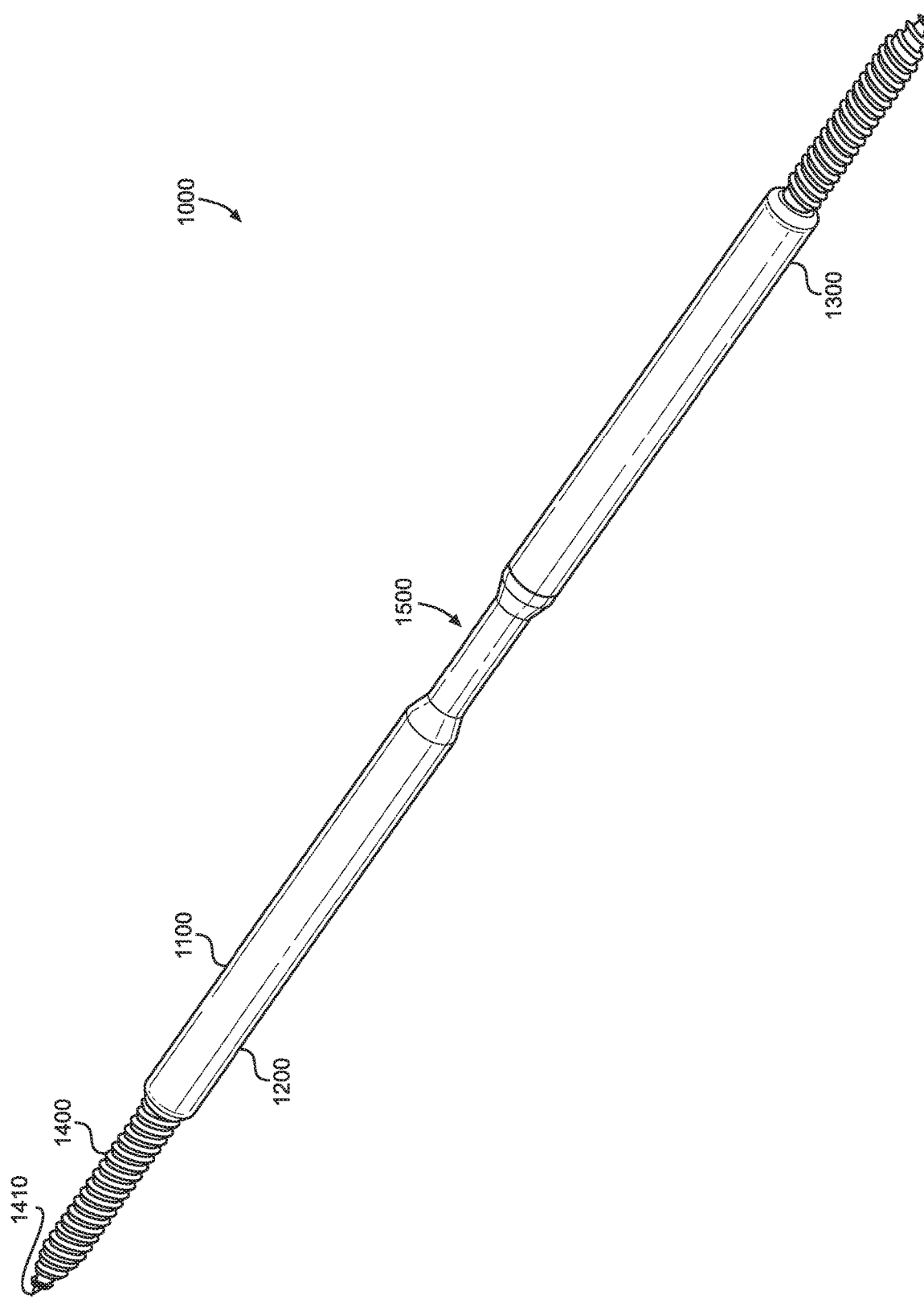
FIG. 1A shows a perspective view of a first embodiment of the cable securing device.

Referring now to FIG. 1, there is shown a perspective view of a first embodiment of the cable securing device. The cable securing device 1000 includes a rod 1100 having a first rod section 1200 and a second rod section 1300. In the illustrated embodiment, the rod 1100 is rigid and linear in order to serve as a guide when passed through a wall. Further, the first rod section and a second rod section 1200, 1300 are coaxially aligned. In the illustrated embodiment, the rod 1100 is composed of a metal composite. However, in alternate embodiments, the rod 1100 is any suitable rigid material, such as plastic. In the illustrated embodiment, the rod 1100 is two to four inches in length so as to fit within an interior of a wall space. However, in alternate embodiments, the rod 1100 is any suitable length configured to pass through a wall. In the illustrated embodiment, the rod 1100 comprises a circular cross section. In this way, the rod 1100 conforms to a shape of a wire or cable.

In the illustrated embodiment, the rod 1100 comprises a middle section 1500 disposed between the first rod section 1200 and the second rod section 1300, wherein the middle section 1500 comprises a diameter smaller than a diameter of either the first or second rod sections 1200, 1300. The middle section 1500 serves to create a handhold or fingerhold for a user when manipulating the cable securing device 1000. In the illustrated embodiment, both the first rod section 1200 and second rod section 1300 comprise a uniform diameter along the entire length thereof. The length is measured along a longitudinal axis of the cable securing device 1000. In some embodiments, the first rod section 1200 comprises a diameter equal to the diameter of the second rod section 1300. In alternate embodiments, the first rod section 1200 comprises a diameter unequal to the diameter of the second rod section 1300. In the illustrated embodiment, the length of the first rod section 1200 is equal to the length of the second rod section 1300.

In the shown embodiment, a first fastener 1400 and a second fastener 1400 (hereinafter referred to as "fastener" or "fasteners") are disposed on each end 1200, 1300 of the rod 1100. In the illustrated embodiment, the fasteners 1400 are conical shaped threads configured to screw into a free end of a cable or wire. The end of each fastener 1400 comes to a sharp point 1410 in order to more easily penetrate a cable or wire. However, in other embodiments, the fastener 1400 is any mechanism configured to secure a cable or wire thereto, such as a point, clip, and the like. In one embodiment, the first fastener 1400 and the second fastener are the same type of fastener. In an alternative embodiment, the first and second fastener 1400 are different. For example, the first fastener is a conical shaped threads and the second fastener is a clip. In some embodiments, the cable securing device consists of only a rod 1100 and a fastener 1400 disposed on each end 1200, 1300 thereof.

Figure 1B:
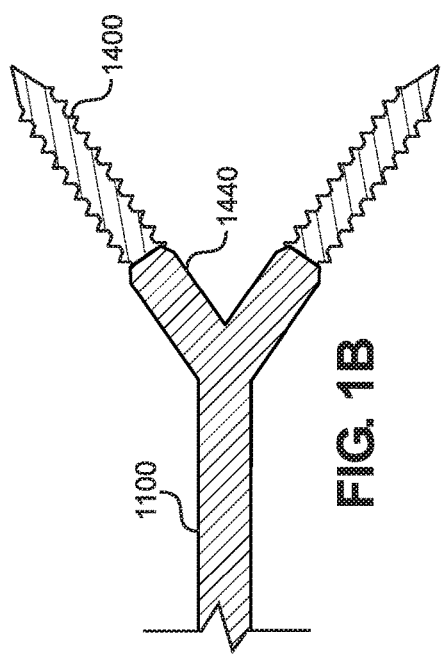
FIG. 1B shows a cross sectional view of a rod section of the cable securing device, wherein the rod section comprises multiple fasteners.

Referring now to FIG. 1B, there is shown a cross sectional view of a rod section of the cable securing device, wherein the rod section comprises multiple fasteners. In some embodiments, a rod section of the rod 1100 includes multiple fasteners 1400 configured to allow multiple wires or cable to be secured to a single end of the rod 1100. In some embodiments, a flexible connector 1440 is disposed between the fastener 1400 from the rod 1100 in order to allow the user to reposition the fastener as needed to comfortably secure the cable to each fastener.

Figure 2:
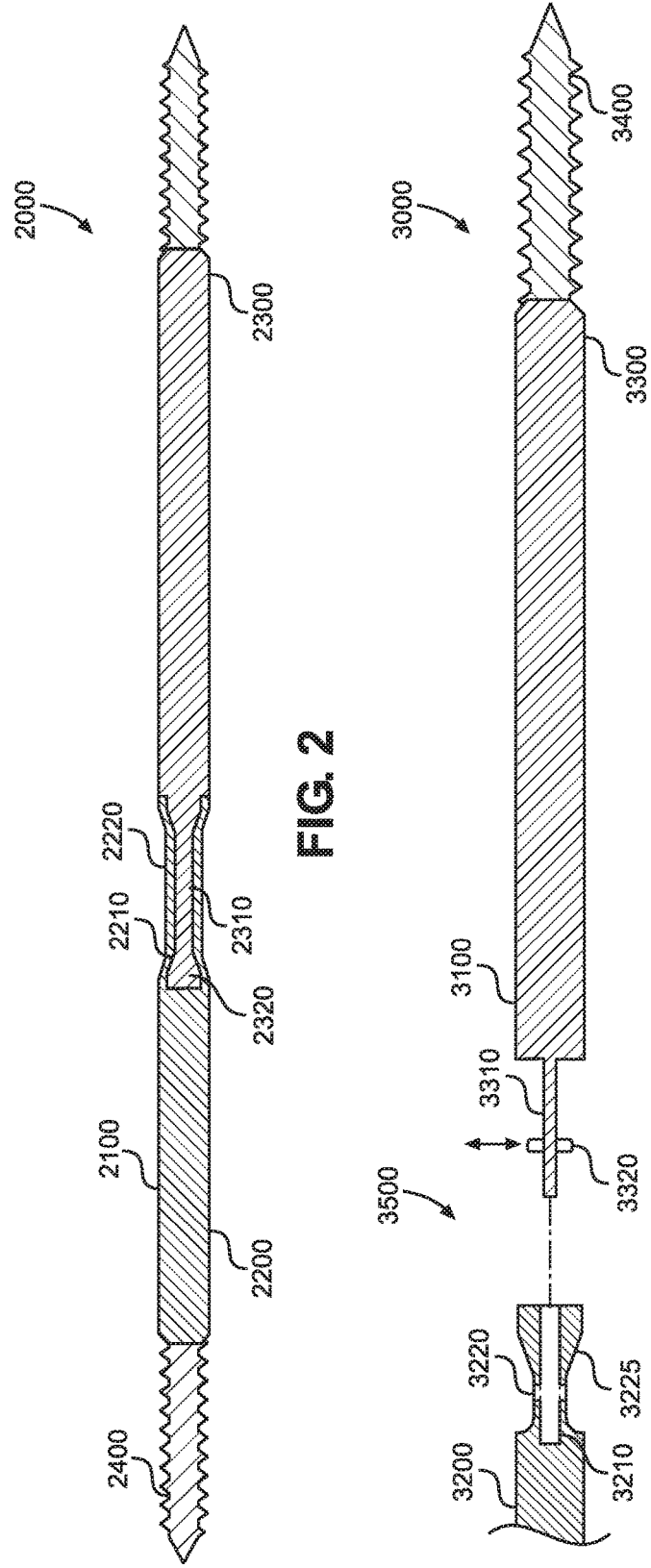
FIG. 2 shows a cross sectional view of a second embodiment of the cable securing device.

Referring now to FIG. 2 there is shown a cross sectional view of a second embodiment of the cable securing device. In the illustrated embodiment, the cable securing device 2000 comprises a rod 2100 having first rod section 2200 rotatably secured to a second rod section 2300. In this way, a user can independently rotate each end 2200, 2300 about a longitudinal axis running through a centerline of a length of the rod 2000, when securing cable to one of the threaded fasteners 2400. In the illustrated embodiment, the rotation of the first rod section 2200 relative to the second rod section 2300 is aligned with and about the longitudinal axis of the rod 2100.

In the shown embodiment, the first rod section 2200 comprises a recess 2210 that receives a notch 2310 disposed on the second rod section 2300 of the rod 2100. The notch 2310 comprises a bulbous end 2320 that rests within the recess 2210. A lip 2220 is disposed around the recess 2210 along the first rod section 2200 wherein the lip 2220 comprises a smaller diameter than a diameter of the recess 2210 housing the bulbous end 2320 of the notch 2310, thereby preventing removal of the notch 2310. The recess 2210 is larger than the notch 2310, thereby allowing the first rod section 2200 and second rod section 2300 to rotate in opposite directions while secured to one another. In this way, the second rod section 2300 is permanently and rotatably affixed to the first rod section 2200 of the rod 2100. In some embodiments, the cable securing device 2000 consists of a rod 2100 having a first rod section 2200 rotatable secured to a second rod section 2300, and a fastener 2400 disposed on each end 2200, 2300 thereof.

Figure 3:
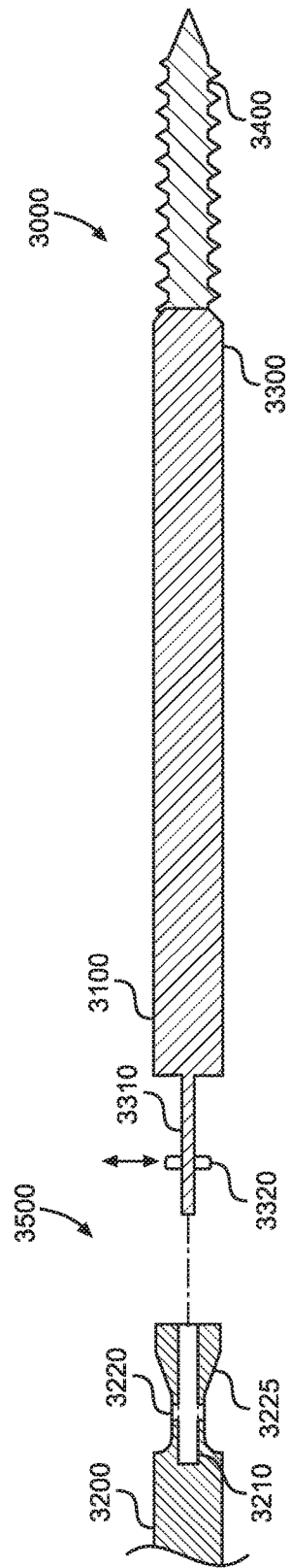
FIG. 3 shows a cross sectional view of a third embodiment of the cable securing device.

Referring now to FIG. 3, there is shown a cross sectional view of a third embodiment of the cable securing device. In the illustrated embodiment, the first rod section 3200 is removably secure to the second rod section 3300 of the rod 3100 via a rod section fastener 3500. In one embodiment, the rod section fastener 3500 is a ball or pin detent latching mechanism to allow for quick release of the ends 3200, 3300 of the rod 3100. The first rod section 3200 comprises a recess 3210 configured to receive a shaft 3310 having a spring-loaded pin or ball plunger 3320, wherein the ball plunger 3320 is biased to an extended position and configured to retract within the shaft 3310 when the shaft 3310 is moved into the recess 3210. The recess 3210 comprises a pair of openings 3220 extending through a sidewall thereof. As the ball plunger 3320 moved into the recess 3210 and reaches the openings 3220, it automatically extends into the openings 3220 and locks the second rod section 3300 to the first rod section 3200. The openings 3220 are disposed within a tapered section 3220 along the first rod section 3200, wherein the tapered section 3225 is adapted to serve as a fingerhold when a user is separating the first rod section from the second rod section by applying force to the ball plunger 3320.

In another embodiment, the rod section fastener 3500 is a pair of mating threads disposed on the first and second rod sections of the rod, allowing a user to screw the rod sections together. In some embodiments, the cable securing device 3000 consists of a rod 3100 having a first rod section 3200 removably secured to a second rod section 3300, and a fastener 3400 disposed on each end 3200, 3300 thereof.

Figure 4:
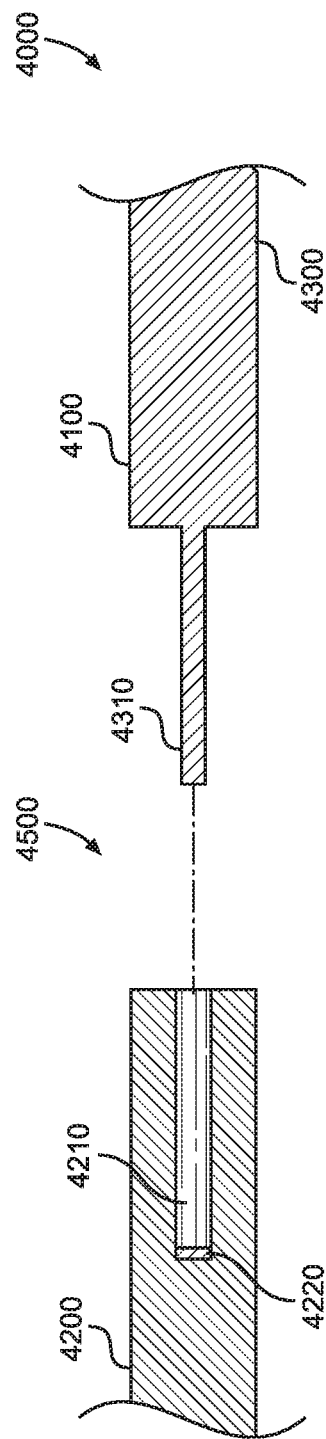
FIG. 4 shows a cross sectional view of a fourth embodiment of the cable securing device wherein the first rod section and second rod section are detached from one another.

Referring now to FIG. 4, there is shown a cross sectional view of a fourth embodiment of the cable securing device. The first rod section 4200 and second rod section 4300 of the rod 4100 are removably secured to one another, similar to the third embodiment, however, the first rod section 4200 is configured to rotate relative to the second rod section 4300 when secured to one another. In the illustrated embodiment, the rod section fastener 4500 comprises a recess 4210 disposed within the first rod section 4200 and a shaft 4310 extending from the second rod section 4300. The recess 4210 is magnetically securable to the shaft 4310. In the illustrated embodiment, a magnet 4220 is disposed at the base of the recess 4210 and the shaft 4310 is composed of ferromagnetic material. In some embodiments, the first rod section 4200 is removably secured to the second rod section 4300 of the rod 4100 via a friction fit. In alternate embodiments, the cable securing device 4000 comprises any suitable fastener configured to removably secure the first rod section 4200 to the second rod section 4300 of the rod 4100.

Figure 5:
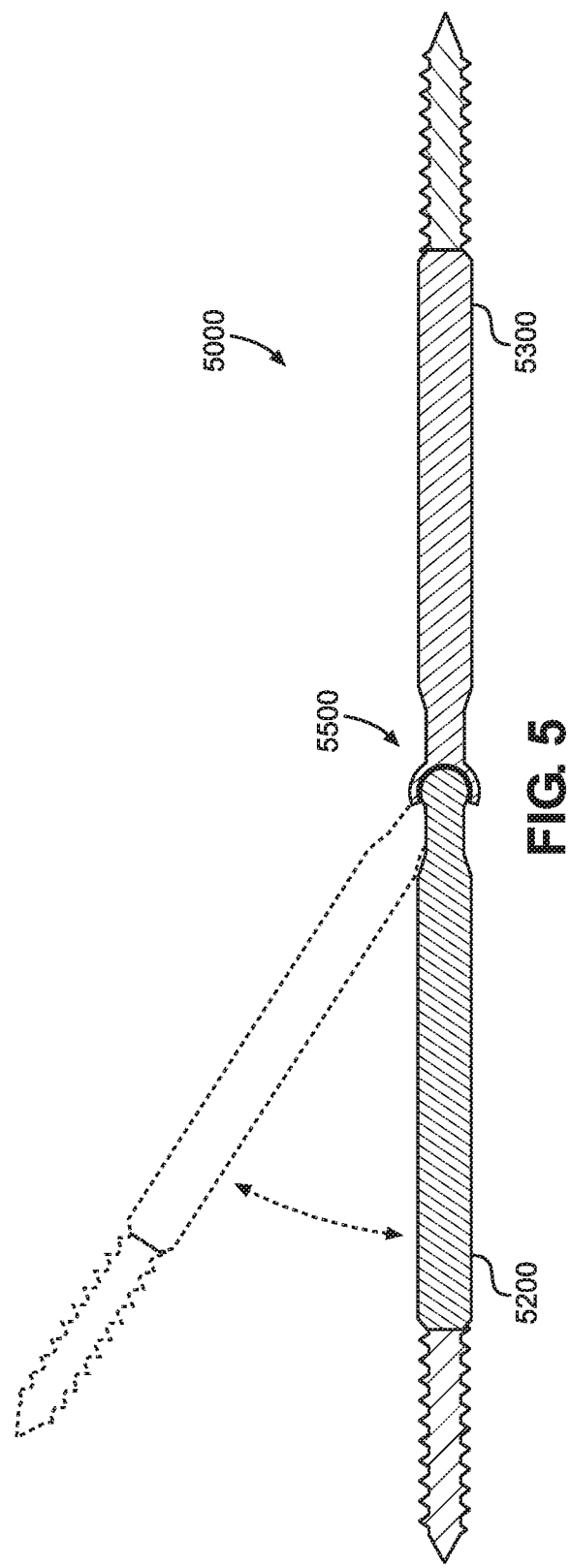
FIG. 5 shows a cross sectional view of a fifth embodiment of the cable securing device wherein the first rod section and second rod section are detached from one another.

Referring now to FIG. 5, there is shown a cross sectional view of a fifth embodiment of the cable securing device. In the illustrated embodiment, the first rod section 5200 is pivotally and rotatably secured to the second rod section 5300 of the rod 5100, such the first rod section 5200 can be disposed at any angle equal to or between 90 degrees and 180 degrees to the second rod section 5300. This allows a user to bend the rod 5100 in order to achieve the best angle for conveniently securing an old and new cable to each opposing end of the rod. In alternative embodiments, the first rod section 5200 may form an acute angle to the second rod section 5300. The pivot permits the first rod section 5200 of the rod 5100 to rotate 360 degrees around the second rod section 5300. In the illustrated embodiment, the rod section fastener 5500 is a ball and socket joint. However, in alternate embodiments, the rod section fastener 5500 is any suitable fastener configured to allow the first rod section 5200 to pivot and rotate around the second rod section 5300 of the rod 5100.

Figure 6:
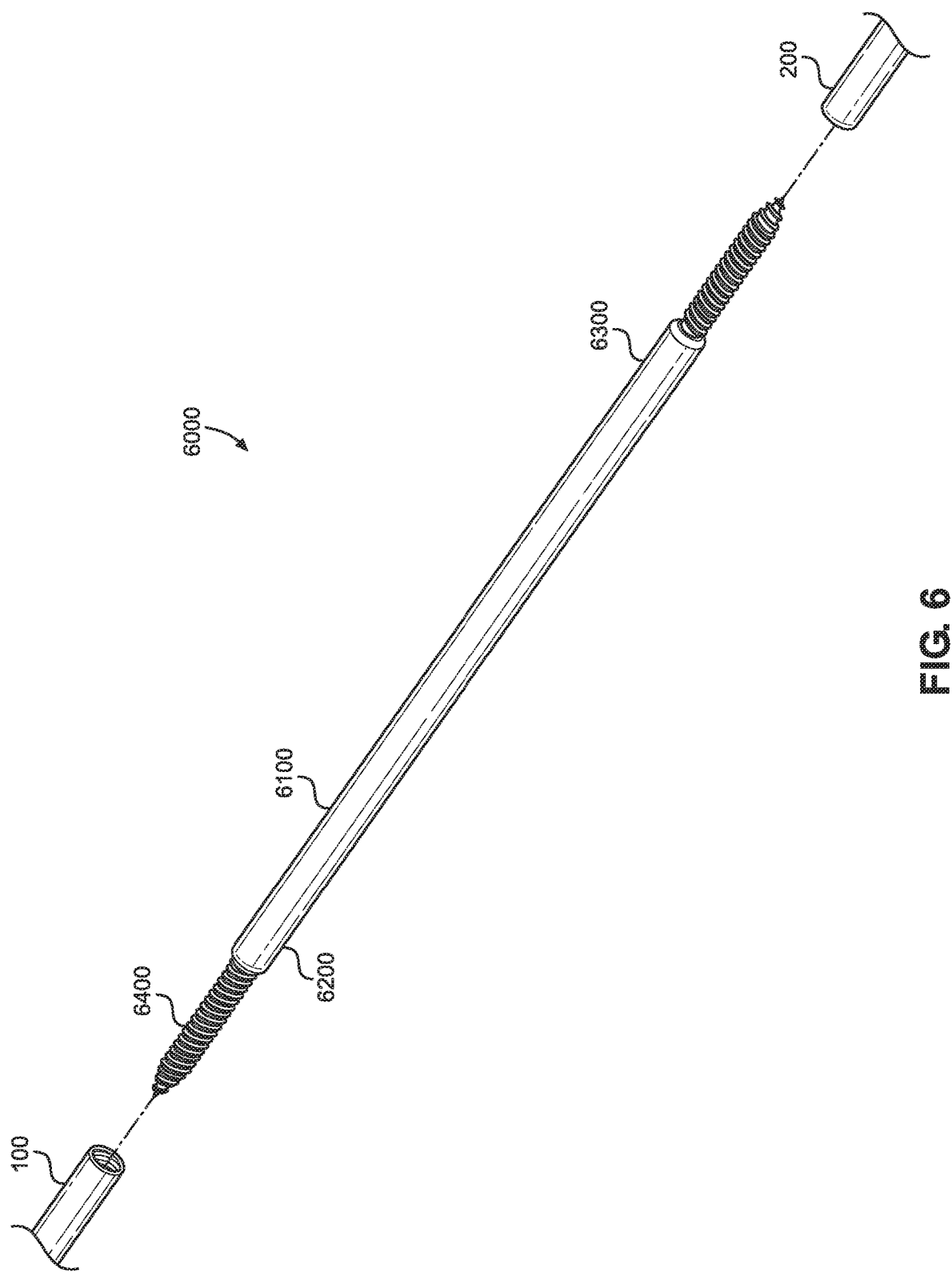
FIG. 6 shows a perspective view of a sixth embodiment of the cable securing device in use.

Referring now to FIG. 6, there is shown a perspective view of a sixth embodiment of the cable securing device in use. In the illustrated embodiment, the rod 6100 comprises a uniform diameter along the entire length thereof. In operation of one embodiment, a user secures a threaded fastener 6400 of the first rod section 6200 to a first cable 100 and secures the second rod section 6300 to a second cable 200, wherein the first cable 100 is a new cable to be installed and the second cable 200 is an old cable to be removed during the installation process. The rod 6100 is pushed, pulled, or otherwise feed through a wall such that the old cable is removed simultaneously while the new cable is installed.

In operation of another embodiment, a new cable is secured to the threaded fastener on the first rod section and an old cable is secured to the threaded fastener on the second rod section. The user rotates the first rod section and second rod section in opposite directions in order to fully thread the fasteners to the cables. Once the old and new cables are secured to the cable securing device, the rod is pushed or pulled through a wall such that the old cable is removed simultaneously while the new cable is installed.

In operation of another embodiment, the first rod section of the rod is detached from the second rod section, wherein a user comfortably secures a new cable to the threaded fastener on the first rod section and an old cable to the threaded fastener on the second rod section. The user rotates the first rod section and second rod section in opposite directions in order to thread the fasteners to the cables. The ends of the rod are reattached, and the new cable is threaded into the wall and old cable is removed from the wall through a single action by the user.

Further, the old cable when attached to the cable securing device serves as an installation tool. Due to the accessibility of the old cable outside of crawl spaces, the cable securing device prevents the need for a user to access areas beneath the house in order to install the new cable. Simply by attaching the new and old cable to the cable securing device, the user can pull the new cable through the crawl space via the old cable, thereby saving much time and effort.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of simultaneously installing and removing a cable, comprising:
   providing a rod having a first rod section affixed to a second rod section at a middle section, wherein the first rod section comprises a first fastener disposed at a first distal end thereof and the second rod section comprises a second fastener disposed at a second distal end thereof;
   securing a first cable to the first fastener and a second cable to the second fastener, wherein the second cable is positioned within a wall;
   feeding the first cable through the wall such that the second cable exits the wall.

2. The method of simultaneously installing and removing a cable of claim 1, further comprising:
   separating the first rod section from the second rod section;
   reattaching the first rod section to the second rod section.

3. The method of simultaneously installing and removing a cable of claim 1, further comprising:
   rotating the first rod section around the second rod section.

4. The method of simultaneously installing and removing a cable of claim 1, further comprising:

pivoting the first rod section relative to the second rod section.

\* \* \* \* \*